Feb. 23, 1965    J. A. HERRMANN ETAL    3,170,747
PARALLEL DISTRIBUTION DUCT STRUCTURE
Filed Jan. 30, 1964    2 Sheets-Sheet 1
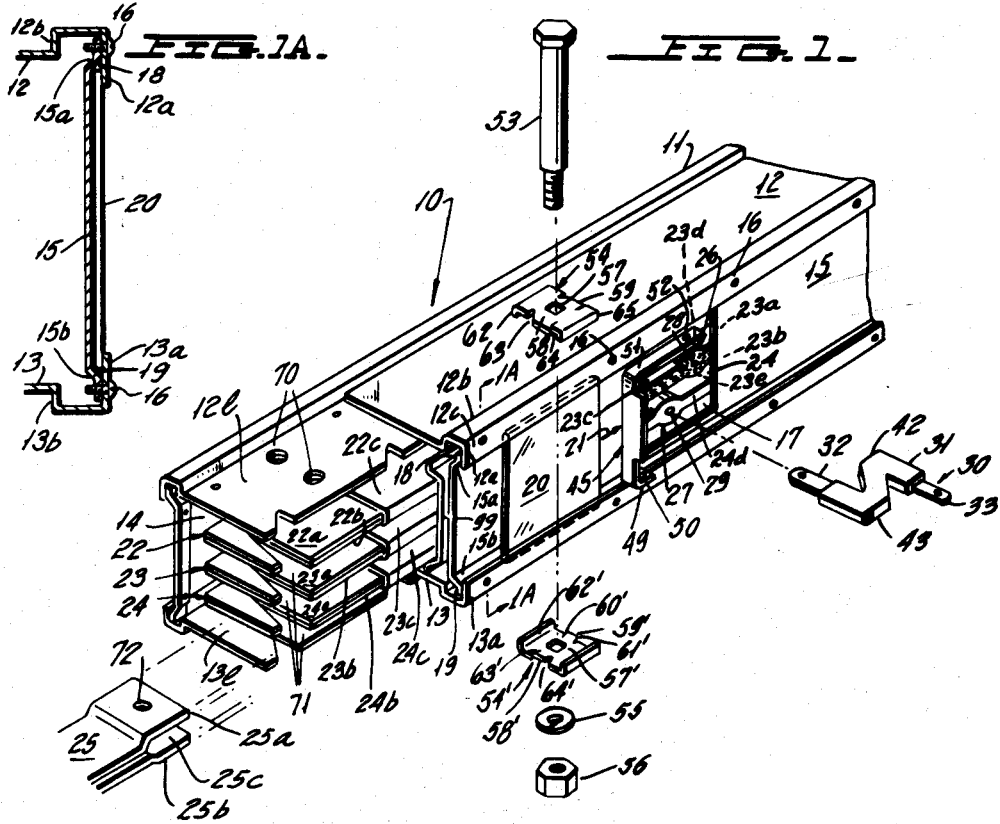
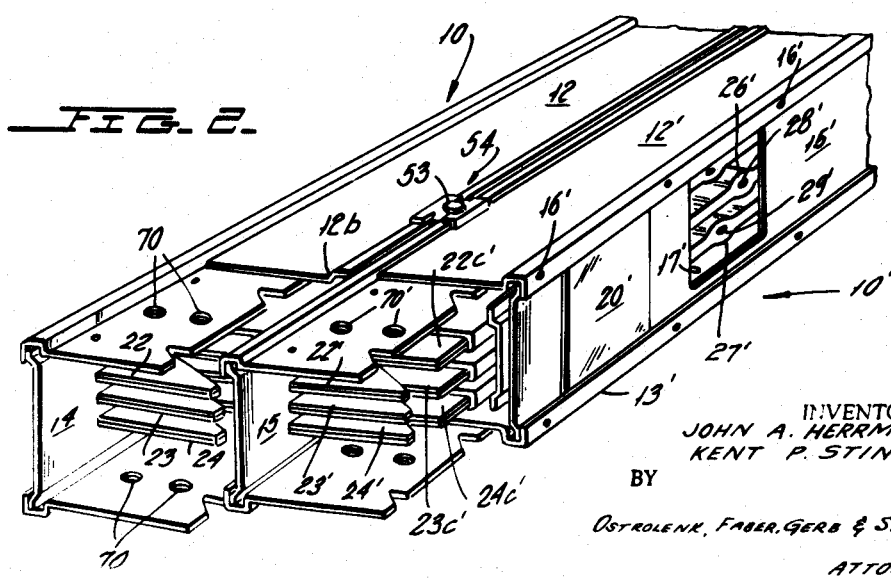
INVENTORS
JOHN A. HERRMANN
KENT P. STINER
BY
OSTROLENK, FABER, GERB & SOFFEN
ATTORNEYS

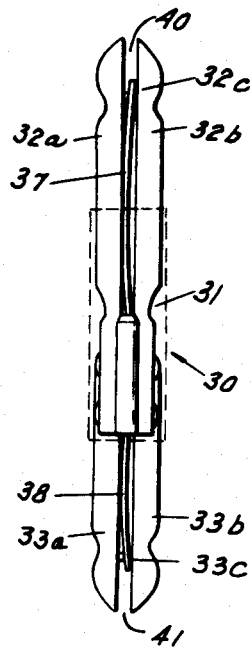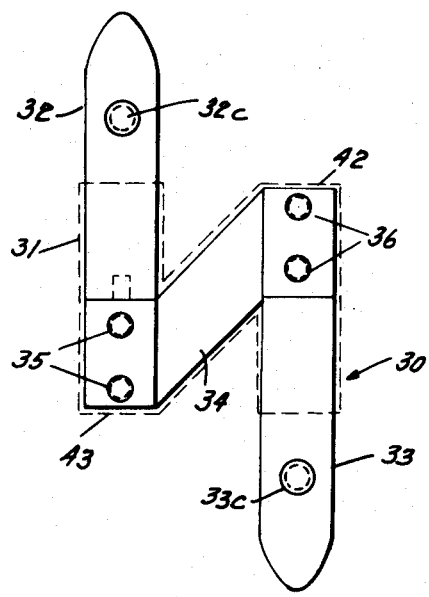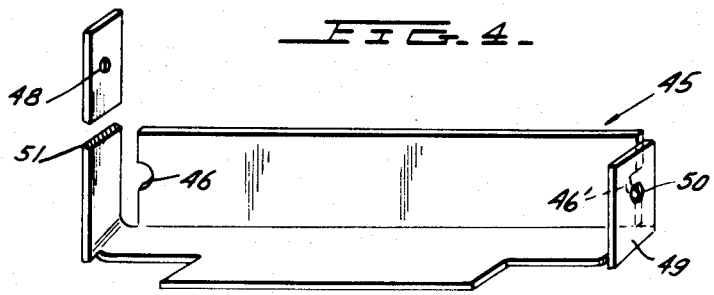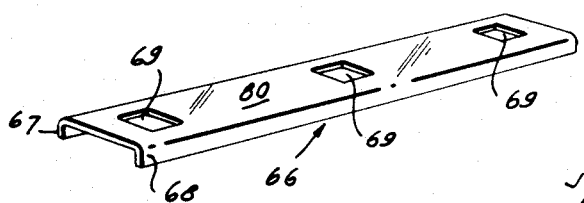

3,170,747
PARALLEL DISTRIBUTION DUCT STRUCTURE
John A. Herrmann, Grosse Pointe Farms, and Kent P. Stiner, Detroit, Mich., assignors to I-T-E Circuit Breaker Company, Philadelphia, Pa., a corporation of Pennsylvania
Filed Jan. 30, 1964, Ser. No. 341,374
15 Claims. (Cl. 339—22)

This application, a continuation-in-part of application Serial No. 105,491 filed April 25, 1961, abandoned subsequent to filing of this application, relates to bus distribution duct and more particularly to bus distribution duct having a novel arrangement for electrically connecting parallel duct runs for increasing the over-all current rating of the duct structure.

Bus ducts comprising a plurality of spaced parallel conductors disposed within an elongated housing are described in detail in U.S. Patent No. 3,088,994 issued May 7, 1963, to J. B. Cataldo, entitled "Clamped Bus-Way Structure" and assigned to the assignee of the instant invention. Openings are provided along a bus duct housing at regular intervals enabling electrical energy to be tapped from the bus duct conductors by means of contact fingers which are part of the plug unit of the type illustrated in U.S. Patent No. 2,861,139, entitled "Bus Duct Plugs With Cover Operated Retractable Contact Fingers," issued November 18, 1958, to W. H. Frank and assigned to the assignee of the instant invention.

The employment of a plurality of these plug-in devices along the bus duct length increases the current magnitude through the bus conductor within the distribution duct since the current flow through the bus duct conductors is equal to the sum of the currents being tapped from the bus duct conductor.

One method of increasing the current carrying capacity of duct structures consists of increasing the cross-sectional area of each bus bar contained within a single enclosure. This is done by increasing the cross-sectional area of each individual bus bar or by the insertion of an increasing number of bus bars in the duct structure and placing adjacent bus bars in electrical parallel connections. It has been shown, however, that increases in bus bar cross-sectional area beyond a certain rating, usually 1,000 amperes, brings only marginal increases in the bus bar current carrying capacity. This, therefore, imposes a practical upper limit upon the physical dimensions of any single conductor which can be used in a bus structure.

Bus bars which are employed in the 200 to 1,000 ampere 600 volt A.C. range normally have cross-sections wherein the width of the cross-section is substantially greater than the thickness. Employment of bus bars of this nature creates an additional problem of mechanical strength characteristics if an attempt is made to manufacture bus bars which are even wider than those presently in use.

The arrangement wherein multiple bus bars for each individual phase are connected in electrical parallel has widespread use in the distribution field and has been found to have advantages in high current transmissiion applications. However, this paralleling arrangement creates problems in the plug-in type of bus duct structures which is specifically designed to have a plurality of plug-in points, thereby creating new problems in the bus structures having parallel connected bus bars. In the high current transmission applications, it is usually necessary to parallel the bus bars only at the prescribed take-off points whereas in plug-in duct distribution structures common bus bars must be electrically paralleled many more times than in the transmission type bus structure.

One present method as described above, which consists of paralleling bus bars, is accomplished by stacking uninsulated bus bars of the same plurality one above the other. Many bus structures presently in use, however, contain bus bars which are insulated along their entire length and which are relatively closely spaced within the bus enclosure. Therefore, a paralleling method, such as that used with uninsulated and widely spaced bus bars, does not lend itself for use with insulated bus bars since it creates difficulties in making connections and also produces an extremely unwieldy structural arrangement. Another factor to be considered is that plug-in type bus structures having ratings which are in excess of 1,000 amperes are very seldom found in distribution systems and for that reason are manufactured in very small quantities, if at all. It would, therefore, be desirous to employ the most commonly upsed bus distribution structures which fall betwen the 200 to 1,000 amperes ratings and parallel these structures with bus structures which also have ratings within the 200 to 1,000 amperes range in order to increase current carrying capacity. By doing this, it becomes easier to standardize distribution components, since very few accessories, outside of the standardized components, will then be needed to design distribution systems capable of handling current ratings above the 1,000 ampere range.

Our invention permits the use of already existing bus structures at higher current ratings without the necessity of any changes in the already existing structures and also without the necessity of modifying bus structures which may be later added to the already existing system.

Our device consists of a novel means for connecting two sections of bus distribution duct structures in electrical parallel so that the current carrying capacity for that section may be twice that of non-parallel bus sections, thereby enabling tap-offs requiring large magnitude currents to be connected to the modified section of the bus run. Novel connecting means for provided which serves both as the means for electrically connecting associated bus conductors of the two bus sections and also as a spacing means for maintaining the proper separation between the adjacent bus enclosures. Bracket means which engage the upper and lower edges of the adjacent bus sections act to position and secure the adjacent bus sections to one another. Shielding means positioned around the duct openings of the joined ducts which face one another, provide protection for the connecting means between the two joined sections thereby avoiding any grounding of the bus conductors to the bus enclosure structure or to any foreign objects. The shielding means also serve to prevent the sliding door, which normally seals the opening in the bus enclosure, from coming into contact with the electrical connecting members between the joined sections. The shielding means further prevents the insertion of tools or the hand or the fingers of an operator into the area of electrical connecting members when the bus sections are properly joined, thereby preventing any harm to those working in the vicinity of the bus structure. The electrical connecting members may be employed at each plug-in point adjacent the associated plug-in point of the section joined thereto, the only limit on the number of electrical conections being the number of plug-in locations in each bus section. The electrical connection means, the bracket means and the shielding means are so desgined that no modifications of existing bus structures are required in order to parallel one bus section to another, thereby permitting a high degree of standardization in the bus sections required for any distribution system. The design also permits more than two bus sections to be joined in parallel, the only effect upon the distribution system being that of requiring supporting structure having sufficient strength to support the weight of the number of paralleled sections to be employed in the system.

It is, therefore, one object of our invention to provide a novel means for electrically paralleling plug-in bus sections.

Another object of our invention is to provide an arrangement for increasing the current carrying capacity of a bus distribution structure containing bus conductors which are insulated along their entire length wherein a novel means is employed for connecting another bus distribution section by employing novel connecting means which serves to connect associated bus conductors and to physically position the joined sections.

Another object of our invention is to provide an arrangement for electrically paralleling plug-in type bus distribution sections having novel means to seal off the region where the electrical connections are made and to position and secure the joined sections to one another.

Still another object of our invention is to provide a novel electrical connecting means for connecting associated bus conductors of adjacent bus distribution sections which is so arranged as to permit its use with already existing bus distribution sections without any requirement of modificaitons which must be made thereto.

These and other objects of the instant invention will become readily apparent after reading the following description of the accompanying drawings, in which:

FIGURE 1 is a partially exploded perspective view showing a portion of a plug-in type bus distribution section in combination with the instant invention.

FIGURE 1A is a cross-section of one of the duct housing walls illustrating the mounting of an access opening door.

FIGURE 2 is a perspective view showing two bus distribution sections joined together.

FIGURES 3a and 3b are top and side views, respectively of the electrical connecting member employed in FIGURE 1.

FIGURE 4 is a perspective view of the shielding member shown in FIGURE 1.

FIGURE 5 is a perspective view showing another embodiment of the clamping means utilized for securing the joined bus sections of FIGURE 2 to one another.

Referring now to the drawings, and more particularly to FIGURES 1 and 2, bus duct unit 10 comprises an elongated housing 11 constructed of members 12 and 13 at the top and bottom thereof secured to side plates 14 and 15 by screw means 16. The central portions of side plates 14, 15 are inwardly offset thereby forming spaces 18, 19 (FIGURE 1A) formed between the edges of side plates 15 and the adjacent edges of top and bottom members 12 and 13 respectively. More particularly, portion 15a of side plate 15 is offset from edge 12a of top member 12 so as to form space 18 therebetween. A similar space 19 is formed between edges 13a and 15b of bottom member 13 and side members 15 respectively. Door 20 is disposed within spaces 18 and 19 so as to be slidable therein. The dimensions of door 20 are such that when moved in the direction of arrow 21 door 20 completely seals opening 17. Although only one door 20 and opening 17 is illustrated in FIGURE 1, it should be understood that bus distribtuion structures of this type contain a plurality of such doors and openings longitudinally spaced along both sides 14 and 15 of the bus housing 11.

Bus duct unit 10 also includes three parallel conductors 22, 23 and 24 disposed within housing 11 and maintained in operative position by plate 99 either alone or in combination with insulator means (not shown) in any manner well known to the art. For details of plate 99, reference is made to U.S. Patent No. 3,012,218 issued December 5, 1961 to J. B. Cataldo entitled "Bus Duct Having Stacked Bus Bars" and assigned to the assignee of the instant invention. Although FIGURE 1 shows three conductors, it should be understood that a greater or lesser number of conductors may be employed without affecting the novelty of the invention. A bus duct run comprises identical bus duct sections such as bus duct section 10 joined end to end in a manner such as that set forth in U.S. Patent 2,041,675 to W. H. Frank et al. entitled "Electrical Distribution Systems" which is assigned to the assignee of the instant invention. Layers 12L and 13L of top and bottom plates 12 and 13, respectively, extend beyond side plate 15 so as to overlap an adjacent housing for mechanical securement of the adjacent duct section. These end to end electrical connections between adjacent bus sections are described in detailed in U.S. Patent No. 3,104,276 issued September 17, 1963 to J. B. Cataldo et al., entitled "Through Bolt Joined for Bus Duct" and assigned to the same assignee as the instant invention. Threaded apertures 70 in top and bottom members 12 and 13 and slots 71 in conductors 22–24 cooperate with apertures not shown in the housing of the adjacent bus section and the apertures in bus bars such as apertures 72 in bus bar 25 for the receipt of fastening means (not shown) which serve as mechanical and electrical connections for the adjacent bus structures. Since this electrical connection plays no novel part in the instant invention, a description of this connection has been omitted due to the complete description set forth in the aforementioned U.S. patents which are incorporated herein by reference.

Each bus bar 22–24 consists of two laminated plated aluminum bars 22a–24a and 22b–24b, respectively, which members abut one another for substantially the entire length of the bus duct section 10. Each bus conductor 22–24 has a plurality of pockets, such as pockets 26 and 27, which are located at pre-determined positions along the length of each bus conductor and within the region of opening 17 for a purpose to be more fully described. The pockets 26 and 27 are formed by bending the upper laminate such as laminate 22a, to substantially a semi-circular shape 23d and bending the lower laminate, such as laminate 23b, to a semi-circular shape 23e and positioning the semi-circular portions of the laminates with their concave surfaces facing one another to form a substantially circular portion.

The bus conductors 22–24 are covered for the entire length thereof except at the ends by resilient insulating material 22c–24c respectively in a manner fully explained in the arofesaid copending U.S. Patent No. 3,088,994. The insulating sleeves 23c and 24c (shown in the region of opening 17) are provided with round openings 28 and 29 respectively which are aligned with the openings of pockets 26 and 27 for a reason to be hereinafter described.

Each pocket 26 and 27 is adapted to receive a resilient type contact finger pair of electrical contact connecting means 30 (FIGURES 3a, 3b). Contact finger pair 32, which comprises two fingers, 32a and 32b, which are joined to Z-shaped member 34 by rivets 35 (see FIGURES 3a and 3b). A spring 37 disposed within recess 40 between fingers 32a and 32b urges these members away from each other and into firm electrical contact with the inner surfaces (not shown) of the laminates of the pocket means, such as pocket means 26, for example. The basic configuration of the contact fingers 32a and 32b and the shape of opening 28 for the pocket means 26 may be modified in a variety of ways, such as those set forth in the now abandoned U.S. application Serial No. 815,562, entitled "Plug-in Section for Bus Duct" filed May 25, 1959, by J. B. Cataldo et al. and assigned to the same assignee as the instant invention. The important characteristics to be kept in mind, however, are that the openings of the pockets 26 and 27 be extremely small when no contact fingers are inserted therein, in order to present a dead front appearance in the plug-in region bounded by opening 17 so that the chances of accidentally short-circuiting conductors of the duct unit 10 to the housing 11 or creating a short circuit between bus conductors is made a practical impossibility.

The resilient material 22c of pocket 26 enlarges at opening 28 upon the insertion of fingers 32a and 32b and upon withdrawal of the contact fingers will return to its normally small dimensions.

The opposing finger pair 33 of connecting member 30 is inserted into the pocket (not shown) of the associated bus conductor which is contained in the bus section to be joined to bus section 10, such as bus section 10' shown in FIGURE 2.

The Z-shaped member 34 (FIGURES 3a and 3b) and the portions of fingers 32 and 33 adjacent the Z-shaped member, are covered with an insulating material 31 which is similar to that used to insulate bus conductors 22–24. The Z-shaped configuration of electrical connecting member limits the distance which finger pair 32 may be inserted in pocket 27 in that shoulder 42 abuts the side 24d of bus conductor 24. The insulating sleeve 31 acts to cover the members 32, 33 and 34 which form the conductive path between the associated bus conductors thereby preventing the occurrence of a short circuit.

The structure of finger pair 33 is identical to that of finger pair 32 as shown in FIGURES 3a and 3b and is inserted into the pocket (not shown) of the associated bus conductor of the bus section to be joined with bus section 10 such as bus section 10', for example. Shoulder 43 abuts against the side of the associated conductor in the same manner as shoulder 42 abuts against the side 24d of conductor 24, in order to limit the depth of the insertion of contact fingers 33a and 33b into the pocket of the associated conductor, for example, the pocket (not shown) of conductor 23' of bus section shown in FIGURE 2. It should be understood that an electrical contact connecting member 30 must be employed for joining each bus conductor contained in the plug-in bus section to the associated bus conductor in the bus section to be joined. For example, three such electrical connecting members of the type of connecting member 30, are required in the paralleling of bus structure 10, shown in FIGURE 2, to bus section 10'.

A shielding member 45, as shown in FIGURES 1 and 4, is positioned with respect to bus structure 10 so that semi-circular slots 46 and 46' are positioned above cooperating apertures (not shown) in side plate 15. Access to the apertures is obtained only by moving door 20 to the position shown in FIGURE 1 thus preventing door 20 from sealing opening 17 when shielding member 45 is screwed into its proper position. Shielding member 45 is longitudinally positioned along bus section side 15 so that it is adjacent the left-hand edge of opening 17. This arrangement prevents any electrical contact between the contact fingers 32a and 32b and the right-hand edge of door 20.

In order to completely surround opening 17, another shielding member (not shown) is positioned in a like manner adjacent the opening of the bus duct section to be joined to bus duct section 10 and a projection similar to projection 51 of shielding member 45 is fastened to the flange 49 of shielding member 45 by means of aperture 50 and flange similar to the flange 49 of shielding means 45 is fastened to the projections of shielding means 45 by means of aperture 48. This structure (only half of which is shown) now completely surrounds the opposing openings of the bus ducts so that the doors of either opening may not be positioned over their associated opening, therefore preventing any electrical contact to member 30.

In order to properly position and secure the joined bus sections, such as the bus sections 10 and 10' shown in FIGURE 2, a bracket structure 54 and 54' is positioned adjacent the top 12–12' and bottom 13–13' edges of the bus sections 10 and 10' respectively. The inner surface of flange 62 (see FIGURE 1) rests against surface 12b of top member 12 and the edge 63 of flap 58 rests against the side 12c of top member 12. The inner surface of flange 65 and edge 64 of flap 58 cooperate with the top of the adjacent bus section, such as bus section 12' of FIGURE 2, in the same manner as do flange 62 and edge 63 described above. Flap members 58 and 59 are designed so that bus sections 10 and 10' are properly spaced from one another. Bracket 54' which is positioned along the lower edges of bottom member 13 and 13' of the adjacent bus sections is arranged in the same manner as bracket 54. A bolt 53 is then inserted through apertures 57 and 57' of brackets 54 and 54' respectively and is secured by washer 55 and nut 56 in order to securely fasten brackets 54, 54' and bus sections 10 and 10' to form a sturdy unitary mechanical structure. It should be understood that as many bracket means as are needed may be positioned along adjacent edges of the joined bus sections 10 and 10' being dependent only upon the mechanical strength required to position one bus section adjacent to another.

The shielding members and plates, only one of each being shown in FIGURE 1, are so designed as to prevent insertion of tools, or the hand, or fingers, of operators, thereby preventing the possibility of any shorting of these foreign objects to the electrical contact fingers pairs such as contact finger pair 32 and 33.

Another method of clamping the adjoining bus sections 10 and 10' consists of the utilization of clamp means 66 shown in FIGURE 5. Clamping member 66 is a relatively long plate having flanges or arms 67 and 68 extending substantially at right angles from the body portion 80. The inner surfaces of flanges 67 and 68 cooperate with the sides of the bus sections, such as sides 12b and 13b shown in FIGURE 1. A plurality of apertures 69 are provided in bracket 66, which permit the insertion of bolts (not shown). It should be understood that a second bracket of the same construction as bracket 66 is placed along the bottom edges of the adjacent bus section and fastened in the same manner as bracket members 54 and 54' shown in FIGURE 1. The bolts which are positioned through the apertures 69 in brackets 66 may also provide a means for hanging the joined sections from overhead locations, which is quite often the case in bus distribution installations. Brackets 66 may be designed so that their lengths are greater than the lengths of the plug-in openings, such as opening 17 shown in FIGURE 1. This being the case, brackets 66 serve to prevent the introduction of any foreign matter or objects into the opening 17, since they completely seal this region, thereby avoiding the need for plates 51 adjacent to each shielding member 45. Since brackets 66 are longer than opening 17 the bolts (not shown) passing through the end apertures will not interfere with connecting means 30.

It should further be understood that standard bus distribution sections have a plurality of plug-in openings although only one such opening has been portrayed in the figures and the number of plug-in parallel connections between the bus ducts being joined together is limited only by the number of openings contained in the bus sections.

It can be seen from the foregoing that we have provided a means for increasing the current carrying capacity of distribution bus sections by providing means to parallel standardized bus distribution sections. The connecting means are simple in design, relatively easy to use, and cooperate with associated positioning and securing means to form a rigid overall structure which is arranged to prevent the introduction of foreign objects into the region of the plug-in connections whereas the entire connecting structure avoids the necessity of any modification whatsoever to the bus distribution sections to be joined.

Although we have here described preferred embodiments of our novel invention, many variations and modifications will now be apparent to those skilled in the art and we, therefore, prefer to be limited not by the specific disclosure herein but only by the appending claims.

We claim:

1. For use in electrically paralleling two bus distribution sections, conductive means having a first pair of plug-in type contact fingers for engagement with a first bus bar in a first bus distribution section, a central conductive member, a second pair of plug-in type contact fingers for engagement with a second bus bar in a second bus distribution section, said conductive member being connected between said first and second contact fingers to establish a conductive path therethrough; said conductive member and said first contact fingers defining a first acute angle, said conductive member and said second contact fingers defining a second acute angle, said conductive member having a first and second shoulder adjacent said first and second contact fingers respectively, for positioning said contact fingers with respect to said first and second bus bars respectively.

2. In an arrangement electrically paralleling two bus distribution sections, a first and a second bus distribution section comprising first and second bus bars, respectively, and first and second housings, respectively, wherein said first and said second bus bars are disposed, conductive means having a first pair of contact fingers in engagement with said first bus bar, a central conductive member, a second pair of contact fingers in engagement with said second bus bar, said conductive member being connected between said first and second contact fingers to establish a conductive path therethrough, said conductive member having a first and second shoulder adjacent said first and second contact fingers respectively, for positioning said contact fingers with respect to said first and second bus bars respectively, clamping means securing said first bus section to said second bus section, said clamping means including first and second brackets positioned along the adjacent top and bottom edges respectively of said first and second bus sections housings, each of said brackets having first and second flanges and an aperture for receiving fastening means, said flanges being adapted to firmly grip and secure said bus sections to one another when said fastening means is mounted therethrough.

3. In an arrangement electrically paralleling two bus distribution sections, a first and a second bus distribution section comprising first and second bus bars, respectively, and first and second housings, respectively, wherein said first and said second bus bars are disposed, conductive means having a first pair of contact fingers in engagement with said first bus bar, a second pair of contact fingers in engagement with said second bus bar, said conductive member being connected between said first and second contact fingers to establish a conductive path therethrough, said conductive member having a first and second shoulder adjacent said first and second contact fingers respectively, for positioning said contact fingers with respect to said first and second bus bars respectively, clamping means securing said first and second bus section to said second bus section, said clamping means including first and second brackets positioned along the adjacent top and bottom edges respectively of said first and second bus sections housings, each of said brackets having first and second flanges and an aperture for receiving fastening means, said flanges being adapted to firmly grip and secure said bus sections to one another when said fastening means is mounted therethrough, each of said brackets having first and second flaps located on the bracket portion separating said flanges and position said bus sections a predetermined distance from one another in order to secure the proper spacing between said bus sections.

4. In an arrangement electrically paralleling two bus distribution sections; a first and a second bus distribution section comprising first and second bus bars, respectively, and first and second housings, respectively, wherein said first and said second bus bars are disposed, conductive means having a first pair of contact fingers in engagement with said first bus bar, a central conductive member, a second pair of contact fingers in engagement with said second bus bar, said conductive member being connected between said first and second contact fingers to establish a conductive path therethrough, said conductive member having a first and second shoulder adjacent said first and second contact fingers respectively, for positioning said contact fingers with respect to said first and second bus bars respectively, clamping means securing said first bus section to said second bus section, said clamping means including first and second brackets positioned along the adjacent top and bottom edges respectively of said first and second bus sections housings, each of said brackets having first and second flanges and an aperture for receiving fastening means, said flanges being adapted to firmly grip and secure said bus sections to one another when said fastening means is mounted therethrough, first and second shielding means mounted to said first and second bus sections housings respectively, said first and second shielding means being adapted to form a protective wall surrounding the region of said conductive means to prevent the introduction of foreign objects into the region of the electrical connections when said bus sections are positioned and secured by said clamping means thereby avoiding any short circuiting between a foreign object and said electrical connections.

5. In combination first and second bus ducts each being comprised of an elongated housing and a plurality of longitudinally extending electrical conductors disposed within each said housing; each of said housings having an opening therein defining a location at which power may be tapped from said bus duct; pocket means individual to each of said conductors in each of said housings having an opening operatively positioned in alignment with said housing opening to receive conductive member contact fingers which engage said conductors, said housing openings of said first and second bus ducts being positioned immediately adjacent one another, a conductive member having first and second contact finger pairs, said first contact finger pair entered into said pocket means of one of said conductors of said first duct in electrical engagement therewith and said second contact finger pair entered into said pocket means of one of said conductors of said second duct in electrical engagement therewith, a conductive central portion connecting said first and second contact finger pairs, said central portion having first and second shoulders adjacent said first and second contact finger pairs for positioning said contact fingers with respect to said pocket means for locating said bus ducts with respect to each other.

6. The combination of claim 5 also comprised of clamping means for mechanically joining said first and second bus ducts comprising first and second brackets mounted upon adjacent edges of said first and second housings and the top and bottom of said housings respectively, each of said brackets having first and second flanges and an aperture, said first and second housing being secured by said flanges upon the introduction of fastening means through said apertures.

7. The combination of claim 6 in which each of the brackets is provided with first and second flaps located on the bracket portion separating said flanges for positioning said bus ducts a spaced distance apart from one another in order to secure the proper spacing between said bus sections.

8. In combination, a first and second bus duct each comprised of an elongated housing and a plurality of longitudinally extending electrical conductors disposed within each said housing; each housing having a housing opening therein defining a location at which power may be tapped from said bus duct by means of a power tapping plug unit; pocket means individual to each of said conductors in each housing having an opening operatively positioned in alignment with said housing opening to receive plug unit contact fingers which engage said conductors; door means adapted to be slidably mounted along each of said housings for sealing said housing opening, an opening of each of said first and second bus ducts being positioned adjacent one another, conductive means including first and second pairs of contact fingers, said first contact finger pair engaging the pocket of a conductor in said first duct and said second contact finger pair engaging the pocket of a conductor in said second duct, thereby electrically connecting the last two conductors recited, first and second shielding means connected to said first and second ducts respectively for preventing the sliding doors of the housing from closing upon the conductive means inserted in their associated housing openings.

9. The combination of claim 8 in which there is also a clamping means for mechanically joining said first and second bus ducts comprising first and second brackets mounted upon adjacent edges of said first and second housings and the top an bottom of said housings respectively, each of said brackets having first and second flanges and an aperture, said first and second housings being secured by said flanges upon the introduction of fastening means through said apertures.

10. In combination, first and second bus ducts each comprised of an elongated housing and a plurality of longitudinally extending electrical conductors disposed within each said housing; each of said housings having a housing opening therein defining a location at which power may be tapped from said bus duct by means of a power tapping plug unit; pocket means individual to each of said conductors having an opening operatively positioned in alignment with said housing opening to receive plug unit contact fingers which engage said conductors; said housing opening of said first duct and said housing opening of said second bus duct being positioned adjacent one another, a plurality of connecting means each having first and second pairs of contact fingers; each of said first pairs of contact fingers in electrical contact with an individual conductor of said first duct and each of said second pairs of contact fingers in electrical contact with an individual conductor of said second duct, door means arranged to be slidably mounted along the sides of each of said housings for sealing said housing opening, shielding means positioned along the side of each of said housings adjacent said openings for preventing said door means from engaging said connecting means and to prevent the introduction of foreign objects into the region of said adjacent openings.

11. In combination, first and second bus ducts each comprised of an elongated housing and a plurality of longitudinally extending electrical conductors disposed within each said housing; each of said housings having a housing opening therein defining a location at which power may be tapped from said bus duct by means of a power tapping plug unit; pocket means individual to each of said conductors having an opening operatively positioned in alignment with said housing opening to receive plug unit contact fingers which engage said conductors; said housing opening of said first duct and said housing opening of said second bus duct being positioned adjacent one another, a plurality of connecting means each having first and second pairs of contact fingers; each of said first pairs of contact fingers in electrical contact with an individual conductor of said first duct and each of said second pairs of contact fingers in electrical contact with an individual conductor of said second duct, clamping means for mechanically joining said first and second bus ducts comprising first and second brackets mounted upon adjacent edges of said first and second housings and the top and bottom of said housings respectively, each of said brackets having first and second flanges and an aperture, said first and second housings being secured by said flanges upon the introduction of fastening means through said apertures.

12. A connecting member for use in electrically connecting bus bars positioned in housings of adjacent bus distribution ducts comprising first and second pairs of contact fingers, a Z-shaped member and first and second bias members, said first pair of contact fingers being mounted to one leg of said Z-shaped member, said second pair of contact fingers mounted to the remaining leg of said Z-shaped member, said first bias means mounted between said first pair of contact fingers to urge said contact fingers towards disengagement, said second bias means mounted between said second pair of contact fingers to urge said contact fingers towards disengagement, a sleeve of insulating material covering said Z-shaped member, the knees of said Z-shaped member being adapted to limit the positioning of said first and second contact finger pairs with respect to the bus conductors with which they are to engage.

13. In combination, first and second bus ducts each comprised of an elongated housing and a plurality of longitudinally extending electrical conductors disposed within each said housing; each of said housings having a housing opening therein defining a location at which power may be tapped from said bus duct by means of a power tapping plug unit; pocket means individual to each of said conductors having a pocket opening operatively positioned in alignment with said housing opening to receive plug unit contact fingers which engage said conductors; an insulating means, individual to each of said conductors, covering its associated conductor for at least a portion thereof aligned opposite said housing opening and also covering said pocket means; said insulating means having an opening in alignment with said pocket opening and operatively positioned whereby a plug unit contact finger entering said pocket opening must first pass through said insulating means opening; said insulating means opening being smaller than said pocket opening; each of said conductors being comprised of a first and a second laminate; said first laminate having a transversely extending formation which cooperates with said second laminate to form said pocket means; door means adapted to be slidably mounted along each of said housings for sealing said housing opening, an opening of each of said first and second bus ducts being positioned adjacent one another, conductive means including first and second pairs of contact fingers, said first contact finger pair engaging the pocket of a conductor in said first duct and said second contact finger pair engaging the pocket of a conductor in said second duct, thereby electrically connecting the last two conductors recited, first and second shielding means connected to said first and second ducts respectively for preventing the sliding doors of the elongated housing from closing upon the conductive means inserted in their associated housing openings.

14. In combination, first and second bus ducts each comprised of an elongated housing and a plurality of longitudinally extending electrical conductors disposed within each said housing; each of said housings having a housing opening therein defining a location at which power may be tapped from said bus duct by means of a power tapping plug unit; pocket means individual to each of said conductors having a pocket opening operatively positioned in alignment with said housing opening to receive plug unit contact fingers which engage said conductors; an insulating means, individual to each of said conductors, covering its associated conductor for at least a portion thereof aligned opposite said housing opening and also covering said pocket means; said insulating means having an opening in alignment with said pocket opening and operatively positioned whereby a plug unit contact finger entering said pocket opening must first pass through said insulating means opening; said insulating means opening being smaller than said pocket means opening; said insulating means being comprised of a resilient material; said pocket means having a flared portion defining at least a portion of said pocket means opening; said flared portion being constructed and positioned to receive a portion of said insulating means which is displaced upon the insertion of a plug unit contact finger into said pocket means; door means adapted to be slidably mounted along each of said housings for sealing said housing openings, an opening of each of said first and second bus ducts being positioned adjacent one another, conductive means including first and second pairs of contact fingers, said first contact finger pair engaging the pocket of a conductor in said first duct and said second contact finger pair engaging the pocket of a conductor in said second duct, thereby electrically connecting the last two conductors recited, first and second shielding means connected to said first and second ducts respectively for preventing the sliding doors of the elongated housing from closing upon the conductive means inserted in their associated housing openings.

15. In combination, first and second bus ducts each comprised of an elongated housing and a plurality of longitudinally extending electrical conductors disposed within each said housing; each of said housings having a housing opening therein defining a location at which power may be tapped from said bus duct by means of a power tapping plug unit; pocket means individual to each of said conductors having a pocket opening operatively positioned in alignment with said housing opening to receive plug unit contact fingers which engage said conductors; an insulating means, individual to each of said conductors, covering its associated conductor for at least a portion thereof aligned opposite said housing opening and also covering said pocket means; said insulating means having an opening in alignment with said pocket opening and operatively positioned whereby a plug unit contact finger entering said pocket opening must first pass through said insulating means opening; said insulating means opening being smaller than said pocket opening; said insulating means being comprised of a resilient material; an opening of each of said first and second bus ducts being positioned adjacent on one another, connecting means having first and second pairs of contact fingers for electrically connecting associated conductors of said first and second ducts thereby electrically connecting the last two conductors recited, door means arranged to be slidably mounted along the sides of each of said housings for sealing said housing opening, shielding means positioned along the sides of each of said housings adjacent said openings for preventing said door means from engaging said connecting means and to prevent the introduction of foreign objects into the region of said adjacent openings.

References Cited by the Examiner

UNITED STATES PATENTS

| | | | |
|---|---|---|---|
| 1,531,917 | 3/25 | French | 339—64 |
| 2,322,799 | 6/43 | Frank | 339—22 |
| 2,430,557 | 11/47 | Carlson | 174—71 |
| 2,972,656 | 2/61 | Fisher | 339—31 X |
| 2,997,523 | 8/61 | Weimer et al. | 174—99 |

FOREIGN PATENTS

| | | |
|---|---|---|
| 140,318 | 12/19 | Great Britain. |
| 840,456 | 1/39 | France. |

JOSEPH D. SEERS, *Primary Examiner*.